US011983151B2

(12) United States Patent
Muthukrishnan et al.

(10) Patent No.: US 11,983,151 B2
(45) Date of Patent: May 14, 2024

(54) RESILIENCE BASED DATABASE PLACEMENT IN CLUSTERED ENVIRONMENT

(71) Applicant: Oracle International Corporation, Redwood Shores, CA (US)

(72) Inventors: Nagarajan Muthukrishnan, Foster City, CA (US); Binoy Sukumaran, Foster City, CA (US); Garret F. Swart, Palo Alto, CA (US); Sumanta Chatterjee, Menlo Park, CA (US); Ravi Shankar Thammaiah, Redwood City, CA (US)

(*) Notice: Subject to any disclaimer, the term of this patent is extended or adjusted under 35 U.S.C. 154(b) by 210 days.

(21) Appl. No.: 17/334,360

(22) Filed: May 28, 2021

(65) Prior Publication Data

US 2022/0382721 A1    Dec. 1, 2022

(51) Int. Cl.
*G06F 16/21*    (2019.01)
*G06F 11/20*    (2006.01)
*G06F 11/34*    (2006.01)
*G06F 16/25*    (2019.01)
*H04L 67/1001*    (2022.01)

(52) U.S. Cl.
CPC ............ *G06F 16/21* (2019.01); *G06F 11/203* (2013.01); *G06F 11/3428* (2013.01); *G06F 16/256* (2019.01); *H04L 67/1001* (2022.05)

(58) Field of Classification Search
CPC ............................... G06F 16/21; G06F 16/256
See application file for complete search history.

(56) References Cited

U.S. PATENT DOCUMENTS

| 7,272,600 B1 | 9/2007 | Singh |
| 7,366,713 B2 | 4/2008 | Kaluskar |
| 7,406,515 B1 | 7/2008 | Joyce |

(Continued)

FOREIGN PATENT DOCUMENTS

CN    104951425 B    9/2015

OTHER PUBLICATIONS

Li et al. "Modeling for Dynamic Cloud Scheduling via Migration of Virtual Machines," 2011, "IEEE Third International Conference on Cloud Computing Technology and Science," pp. 163-171 (Year: 2011).*

(Continued)

*Primary Examiner* — Charles D Adams
(74) *Attorney, Agent, or Firm* — Hickman Becker Bingham Ledesma LLP; Brian Miller

(57) ABSTRACT

Herein are resource-constrained techniques that plan ahead for resiliently moving pluggable databases between container databases after a failure in a high-availability database cluster. In an embodiment, a computer identifies many alternative placements that respectively assign each pluggable database to a respective container database. For each alternative placement, a respective resilience score is calculated for each pluggable database that is based on the container database of the pluggable database. Based on the resilience scores of the pluggable databases for the alternative placements, a particular placement is selected as an optimal placement that would maximize utilization of computer resources, minimize database latencies, maximize system throughput, and maximize the ability of the database cluster to avoid a service outage.

20 Claims, 5 Drawing Sheets

(56) References Cited

U.S. PATENT DOCUMENTS

| | | | |
|---|---|---|---|
| 7,634,477 | B2 | 12/2009 | Hinshaw |
| 8,335,767 | B2 | 12/2012 | Das |
| 8,600,977 | B2 | 12/2013 | Dageville |
| 9,189,260 | B2 * | 11/2015 | Attalla ............... G06F 9/45558 |
| 9,189,522 | B2 | 11/2015 | Das |
| 9,424,094 | B2 * | 8/2016 | Cardosa ............... G06F 9/5094 |
| 10,063,651 | B2 | 8/2018 | Carter |
| 10,268,513 | B2 | 4/2019 | Jackson et al. |
| 10,348,565 | B2 | 7/2019 | Kannan et al. |
| 10,374,809 | B1 | 8/2019 | Dasarakothapalli |
| 11,163,647 | B2 * | 11/2021 | Chopra ............... G06F 11/1464 |
| 11,336,519 | B1 | 5/2022 | Greenwood et al. |
| 2003/0154236 | A1 | 8/2003 | Dar |
| 2004/0024888 | A1 | 2/2004 | Davis |
| 2004/0186826 | A1 | 9/2004 | Choi |
| 2005/0038831 | A1 | 2/2005 | Souder |
| 2006/0179042 | A1 | 8/2006 | Bram |
| 2008/0016123 | A1 | 1/2008 | Devraj et al. |
| 2011/0126197 | A1 | 5/2011 | Larsen |
| 2012/0173717 | A1 | 7/2012 | Kohli |
| 2013/0198211 | A1 | 8/2013 | Kohkaki |
| 2014/0007097 | A1 | 1/2014 | Chin et al. |
| 2015/0254240 | A1 | 9/2015 | Li |
| 2016/0014038 | A1 | 1/2016 | Thyagarajan |
| 2016/0036623 | A1 | 2/2016 | Clarkson |
| 2016/0094406 | A1 | 3/2016 | Phan |
| 2016/0321588 | A1 | 11/2016 | Das et al. |
| 2017/0046205 | A1 | 2/2017 | Kofkin-Hansen |
| 2017/0316085 | A1 | 11/2017 | Gupta |
| 2017/0373940 | A1 | 12/2017 | Shahab et al. |
| 2018/0096252 | A1 | 4/2018 | Fagundes |
| 2018/0107711 | A1 | 4/2018 | Tariq |
| 2018/0137139 | A1 | 5/2018 | Bangalore |
| 2019/0102384 | A1 | 4/2019 | Hung |
| 2019/0102411 | A1 | 4/2019 | Hung et al. |
| 2019/0377611 | A1 * | 12/2019 | Khan ............... G06F 9/5038 |
| 2020/0104375 | A1 | 4/2020 | Earnesty, Jr. et al. |
| 2021/0096927 | A1 | 4/2021 | Zhu et al. |

OTHER PUBLICATIONS

Talebian et al., "Optimizing Virtual Machine Placement in IaaS Data Centers: Taxonomy, Review and Open Issues", Springer Nature 2019, https://doi.org/10.1007/s10586-019-02954-, dated Jun. 2019, 42 pages.

Masdari et al., "An Overview of Virtual Machine Placement Schemes In Cloud Computing", Journal of Network and Computer Applications, http://dx.doi.org/10.1016/j.jnca.2016.01.011, dated Jan. 2016, 34 pages.

Alashaikh et al., "A Survey on the Use of Preferences for Virtual Machine Placement in Cloud Data Centers", https://arxiv.org/pdf/1907.07778.pdf, dated Jan. 16, 2020, 40 pages.

Zisman et al., "An approach to interoperation between autonomous database systems", Distrib. Syst. Engng 6 (1999) 135-148. Printed in the UK, 15 pages.

Yu et al., "Intelligent Database Placement in Cloud Environment", 2012 IEEE 19th International Conference on Web Services, Year 2012, 8 pages.

Weishar et al., "An Intelligent Heterogeneous Autonomous Database Architecture for Semantic Heterogeneity Support", IEEE Workshop on Interoperability in Multidatabase Systems, dated Apr. 1991, 9 pgs.

Urbano Randy et al., "Oracle Database Administrator's Guide", 12c Release dated Jul. 31, 2017, pp. 1-1500.

Rodd et al., "Adaptive Tuning Algorithm for Performance tuning of Database Management System", (IJCSIS) International Journal of Computer Science Information Security,vol. 8, No. 1, Apr. 2010, 4pgs.

Pavlo, "Self-Driving Database Management Systems", 8th Biennial Conference on Innovative Data Systems Research (CIDR '17), Jan. 8-11, 2017, Chaminade, California, USA, 6 pages.

Maenhaut et al., "Design and Evaluation of a Hierarchical Multi-Tenant Data Management Framework for Cloud Applications", dated 2015, 6 pages.

Gulati et al., "VMware Distributed Resource Management: Design, Implementation, and Lessons Learned", https://www.waldspurger.org/carl/papers/drs-vmtj-mar12.pdf, Year 2012, 20 pages.

Gey et al., "Evolving Multi-tenant SaaS Applications through Self-Adaptive Upgrade Enactment and Tenant Mediation", SEAMS'May 16-17, 2016, 2016, Austin, TX, USA 2016 AC,7 pages.

Das et al., "Scalable and Elastic Transactional Data Stores for Cloud Computing Platforms", dated Dec. 2011, 302 pages.

Das et al., "Automated Demand-Driven Resource Scaling in Relational Database-as-aService", SIGMOD'16, Jun. 26-Jul. 1, 2016, San Francisco, CA, USA, 12 pages.

Beschastnikh et al., "Machine Learning for Automatic Physical DBMS Tuning", dated Dec. 6, 2007, 6 pages.

Agrawal et al., "Database Scalability, Elasticity, and Autonomy in the Cloud", dated 2011, 14 pages.

Agrawal et al. ("Oracle Database Administrator's Guide 12c Release 1 (12.1), Aug. 2014") (Year: 2014).

Kuremoto et al., "Time Series Forecasting Using Restricted Boltzmann Machine", Emerging Intelligent Computing Technology and Applications: 8th International Conference, dated Jul. 2012, 11 pages.

Hung, U.S. Appl. No. 16/135,769, filed Sep. 19, 2018, Office Action, dated Feb. 22, 2021.

Hung, U.S. Appl. No. 16/135,769, filed Sep. 19, 2018, Advisory Action, dated Aug. 11, 2021.

Hung, U.S. Appl. No. 16/135,769, filed Sep. 19, 2018, Office Action, dated Mar. 12, 2020.

Hung, U.S. Appl. No. 16/135,769, filed Sep. 19, 2018, Final Office Action, dated Jul. 7, 2020.

Hung, U.S. Appl. No. 16/055,468, filed Aug. 9, 2018, Office Action, dated Feb. 1, 2021.

Hung, U.S. Appl. No. 16/055,468, filed Aug. 9, 2018, Final Office Action, dated Jun. 9, 2021.

Hung, U.S. Appl. No. 16/055,468, filed Aug. 6, 2018, Non-Final Rejection, dated Aug. 17, 2021.

Hung, U.S. Appl. No. 16/055,468, filed Aug. 6, 2018, Advisory Action, dated Jun. 29, 2021.

Yu et al., "Intelligent Database Placement in Cloud Environment," 2012 IEEE 19th International Conference on Web Services, 2012, pp. 544-551.

* cited by examiner

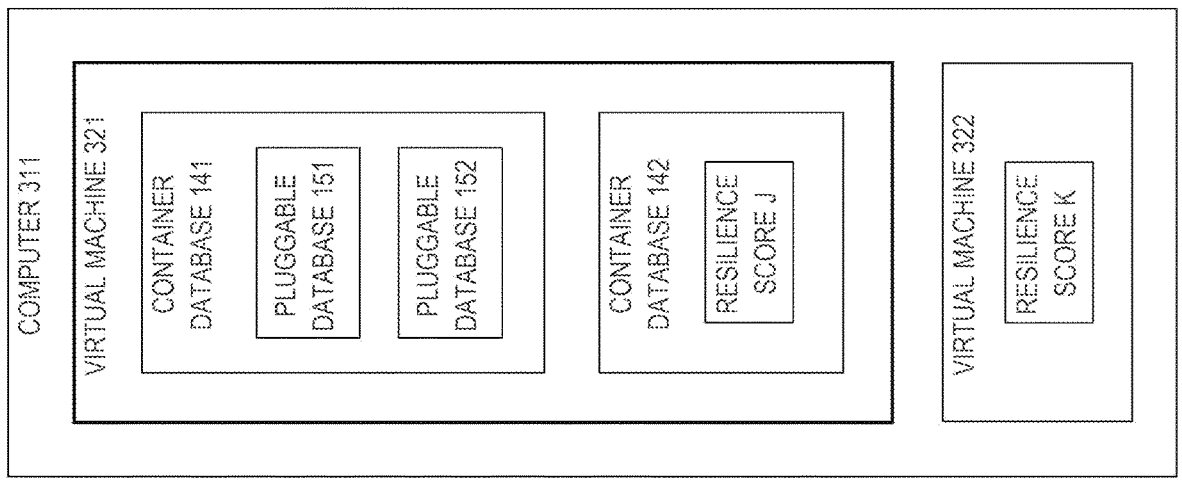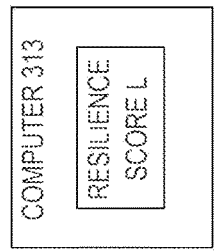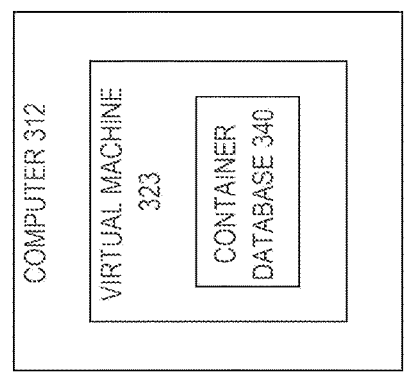
FIG. 3

RESILIENCE BASED DATABASE PLACEMENT IN CLUSTERED ENVIRONMENT

FIELD OF THE DISCLOSURE

This disclosure relates to high availability for a database cluster. Presented herein are resource-constrained techniques that plan ahead for resiliently placing and moving pluggable databases between instances of container database(s) after a failure or planned reconfiguration in the database cluster.

BACKGROUND

In clustered environments such as datacenter(s) or a computer cloud, there can be multiple container databases and pluggable databases placed inside various host computers and virtual machines that are part of a database cluster. These virtual machines, computers, and container databases are likely to have service outages that are expected, such as a software upgrade, or unexpected such as a failure. An outage necessarily includes pluggable databases that should fail over to other hosts or containers in the cluster for high availability.

In autonomous cloud environments, many pluggable databases can be collocated in a same container database such as according to a customer specific isolation requirement. When a failover occurs, surviving hosts and containers will take over hosting of pluggable databases struck by the failure so that the database cluster continue to provide the services. Imbalanced resource distribution caused by failing over can lead to severe operational and performance problems that may cascade into a chain reaction of failures to multiple components and computers.

There are various approaches used in the industry based on typically rigid and simplistic heuristic reconfiguration algorithms. Reconfiguration decisions made by such an algorithm tend to be suboptimal in terms of maximizing cluster-wide performance of pluggable databases by maximizing usage and availability of computer resources such as processing bandwidth and memory. That is because, in clustered environments having multiple container databases, optimal placement of pluggable databases is a very hard combinatoric problem due to many provisioning constraints to satisfy. This optimization problem is further hindered by lack of a single scalar metric to which optimization may be dedicated. For example, if two alternate configurations both satisfy the provisioning constraints, there may be no way to detect which configuration is better. Without such a decision criterion, selecting an optimal configuration from many sufficient configurations may be more or less impossible. Thus, typical approaches select a suboptimal configuration that underutilizes (i.e. wastes) or overloads computer resources, thereby increasing database latencies and decreasing system throughput in the database cluster.

BRIEF DESCRIPTION OF THE DRAWINGS

In the drawings:

FIG. 3 is a block diagram that depicts an example placement that may be a currently operating configuration of a database cluster or an alternative placement for the database cluster in the future;

DETAILED DESCRIPTION

Figure 1:
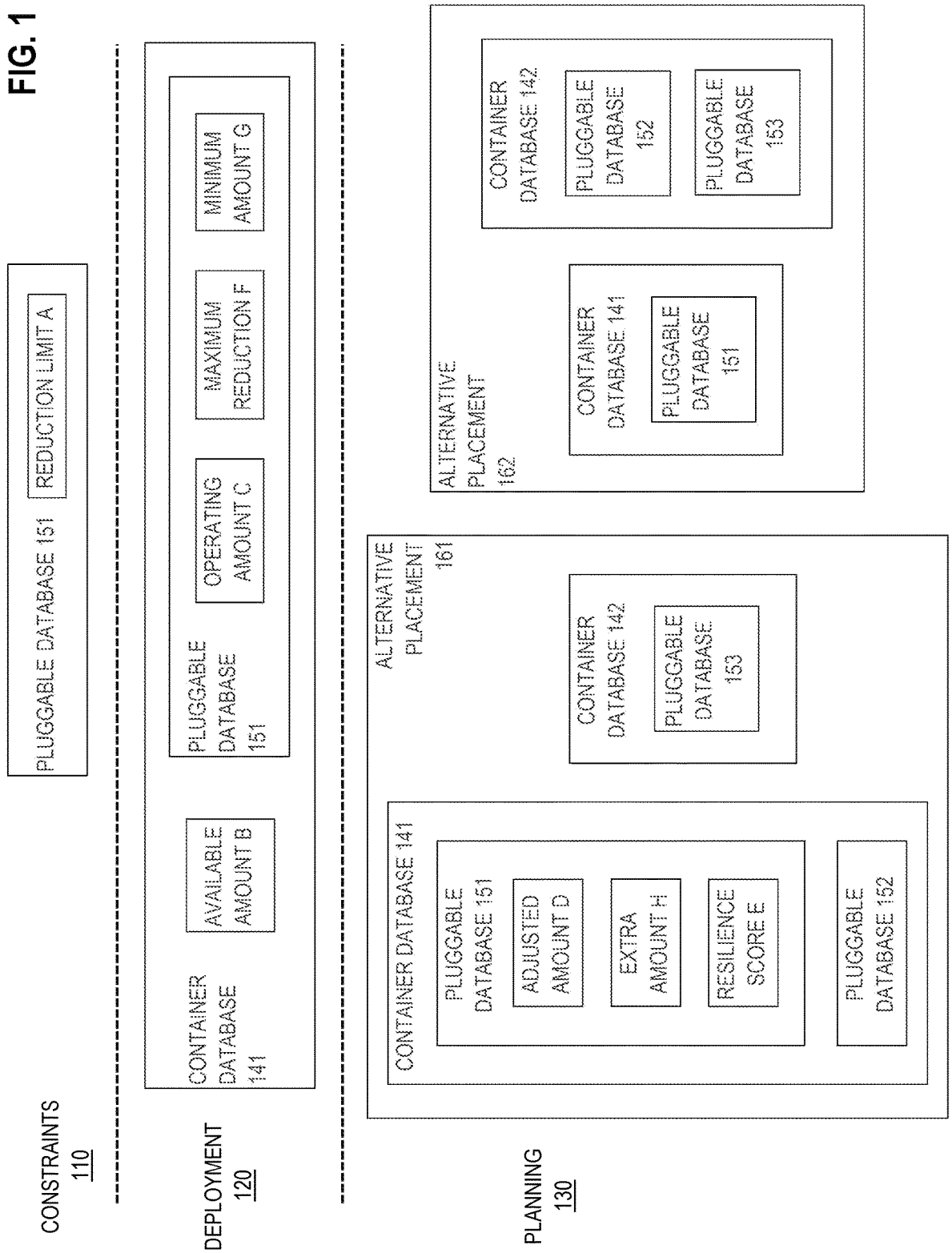
FIG. 1 is a block diagram that depicts an example high-availability database cluster that contains pluggable databases and instances of container database(s)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are techniques that translate failover requirements into a resilience metric for optimizing placement of pluggable databases into instances of container database(s). Under normal operating circumstances, the pluggable databases are more or less guaranteed a commitment of computer resources, such as a number of core processors or an amount of memory. When failover happens in a database cluster, computer resource commitments for running pluggable databases are decreased to fit displaced pluggable databases into possibly fewer surviving instances of container database(s). One goal during placement of pluggable databases may be to find an optimal place for a new pluggable database or an optimal relocating of many or all pluggable databases so that the impact of a future failure in the cluster can be minimized. In an embodiment, a container database is distributed and has multiple instances that may contain same or different metadata and same or different pluggable databases.

Herein, forecasted impact of a future failure is measured as a resilience metric that is a novel numeric scalar referred to herein as a resilience score. Resilience scores behave in ways that facilitate optimal resource allocation in a database cluster. For example, resilience scores are composable so that a resilience score of an instance of a container database may be calculated solely based on the respective resilience scores of the pluggable databases contained in the instance of the container database. Likewise, multiple resilience scores may be directly compared as numbers so that respective resilience scores of alternate configurations may be ranked to select a best configuration with a highest resilience score.

In an embodiment, a resilience score is based on a percent reduction of an amount of a computer resource that had been committed or otherwise provided to a pluggable database, such as an amount of random access memory (RAM) or a fractional amount of a processor core. A failover may cause a chain reaction of cascading failures that spread across the database cluster, in which case pluggable databases may be repeatedly displaced from failing instances of container databases to surviving container database instances, and decreasing resilience scores may be repeatedly recalculated. In an embodiment, potential failures are proactively anticipated and resilience scores are predictions as to respectively how well suited are alternate configurations for absorbing the impact of failures.

Optimization approaches herein maximize resilience scores based on powerful techniques such as linear programming and bin packing. Such placement optimization increases utilization of computer resources, thereby decreasing database latencies and increasing system throughput in the database cluster. Because calculating resilience scores is arithmetically more efficient than other ways of comparing and ranking configurations, more compute time is available for related important tasks such as generating alternate configuration proposals that is combinatorically intensive.

In an embodiment that has a database cluster that contains many pluggable databases and many container databases, a computer identifies many alternative placements that respectively assign each pluggable database to a respective container database. For each alternative placement, a respective resilience score is calculated for each pluggable database that is based on the container database of the pluggable database. Based on the resilience scores of the pluggable databases for the alternative placements, a particular placement is selected as an optimal placement that would maximize utilization of computer resources, minimize database latencies, maximize system throughput, and maximize the ability of the database cluster to avoid a service outage.

1.0 Example Database Cluster

FIG. 1 is a block diagram that depicts an example high-availability database cluster that contains databases 141-142 and 151-153, in an embodiment. The database cluster applies resource-constrained techniques that plan ahead for resiliently moving any of pluggable databases 151-153 between container databases 141-142 after failover. Although not shown and as discussed later herein, the database cluster may contain virtual machine(s) and/or networked computers that host container databases 141-142.

In an embodiment, container databases 141-142 are separate instances of a same multi-instance container database, in which case container databases 141-142 may at different times contain same or different metadata and same or different pluggable databases. In an embodiment, container databases 141-142 may contain respective instances of a same pluggable database such as for horizontal scaling or failover. In an embodiment, pluggable databases 151-153 are instances of same or different multi-instance pluggable databases. In an embodiment, multiple instances of a same pluggable database contain different respective subsets of data such as shards for horizontal partitioning such as for acceleration or for distributed storage of more data than one instance of a pluggable database can store. In an embodiment, perfect replicas of a same pluggable database provide horizontal scaling such as for elastic scaling and/or online analytical processing (OLAP).

In an embodiment, one or some instances of a same pluggable or container database operate as primaries and one or some instances of the same database operate as standbys that may become primaries after failover such as for online transaction processing (OLTP). In an embodiment as discussed later herein, a multi-instance database may experience a sequence of multiple failovers. In an embodiment, standby instances are online for more or less continuous synchronization from primary instances. In an embodiment, standby instances are instead offline (i.e. idle) and do not consume processor bandwidth until activated by failover. In an embodiment for scaling or failover, database instances can share data files in a cross-mounted filesystem.

FIG. 1 is logically divided into three temporal layers 110, 120, and 130 that represent different ways of inspecting and configuring databases 141-142 and 151-153. Constraints 110 specifies time-invariant design constraints that the database cluster should never violate. Constraints 110 specifies more or less rigid requirements for computer resource(s) such as nonvolatile storage, random access memory (RAM), nonvolatile cache such as flash memory, network bandwidth, disk bandwidth, and/or a fraction of a processor core of a central processing unit (CPU). In an embodiment, the fraction of the processor core may be less than ten percent such as one percent.

As discussed later herein, pluggable database 151 may move between container databases 141-142 so long as sufficient resources are available. An embodiment may have multiple multi-instance container databases such as five container database instances of which two are instances of one container database and the remaining three are instances of another container database. In an embodiment, movement of an instance of a pluggable database is restricted to moving between instances of a same container database.

As discussed later herein, moving pluggable database 151 from an overutilized container database to an underutilized container database may provide more of a computer resource such as memory to pluggable database 151. Likewise, moving another pluggable database into a same container database as pluggable database 151 may provide less of the resource to pluggable database 151. For example due to movement of pluggable database 151 and/or other pluggable database(s), memory allocated to pluggable database 151 may be reduced by a percent such as five or fifty.

Depending on the magnitude of the reduction, pluggable database 151 may or may not tolerate the reduction. For example, insufficient memory may cause a malfunction or crash of pluggable database 151, which may have various consequences such as inadequate quality of service (QoS), failed transaction(s), lost or corrupted data, and loss of service. In other words, the database cluster should be careful to avoid movement of a pluggable database that would deny that or another pluggable database sufficient resources for healthy operation. To maintain sufficient resources for all pluggable databases, each pluggable database has a respective specified reduction limit for a resource that should never be violated.

For example as shown, an amount of a resource provided to pluggable database 151 should never be decreased by more than reduction limit A, such as a maximum reduction of 20% of a memory allocation. Reduction limit A is a relative quantity and not a minimum absolute amount of a resource. For example as discussed later herein, when reduction limit A is 50% for processor cores, whether a minimum absolute amount of processor cores is 1.1 or 0.1 depends on whether pluggable database 151 currently (i.e. before reduction) has 2.2 or 0.2 processor cores.

As discussed later herein and although reduction limit A is a relative amount such as a percent, reduction limit A may be derived from a minimum absolute amount of a resource or vice versa. For example, a service level agreement (SLA) may specify either reduction limit A or the minimum absolute amount.

Although not shown, pluggable database 151 may have a same or respective reduction limit for other resources such as disk space and RAM. Although not shown, each of pluggable databases 151-153 may have a respective reduction limit for a same resource. In an embodiment, the database cluster contains at least two thousand pluggable databases, each with their own reduction limit that should be enforced for one or multiple resources.

1.1 Container Database

Deployment 120 reflects the actual configuration of a live production environment in which databases 141-142 and 151-153 are currently operating. For example as shown, container database 141 contains pluggable database 151. Container database 141 has resources that it shares amongst the pluggable database(s) that container database 141 contains. For example as shown, container database 141 has available amount B of a resource that container database 141 can provide to the pluggable database(s) that container database 141 contains. For example, available amount B may be one processor core. Although not shown, container database 141 may have respective available amounts of other resources. Although not shown, deployment 120 may or may not also contain container database 142 that also has a respective available amount of resource(s).

Container database 141 need not share its resources equally amongst its multiple pluggable databases. Instead, container database 141 is configured to share its resources according to need based on the reduction limits for the pluggable databases that container database 141 contains. Pluggable database 151 is not deployed into container database 141 unless container database 141 has available amount B of a resource that is sufficient to not exceed reduction limit A of the resource for pluggable database 151 and simultaneously not exceed respective reduction limits for the resource to other pluggable databases that container database 141 contains.

As explained elsewhere herein, a minimum amount of a resource for pluggable database 151 may be calculated based on pluggable database 151's current amount of the resource and reduction limit A. Thus, each of pluggable databases 151-153 may need a respective minimum amount of a resource based on a respective reduction limit for the resource. Available amount B may exceed the combined minimum amounts needed by the pluggable databases that container database 141 contains, in which case container database 141 has a surplus of the resource that may or may not be provided to one, some, or all of the pluggable database(s) that container database 141 contains.

For example as shown, pluggable database 151 may currently be provided operating amount C of the resource that may be more than a minimum amount of the resource needed by pluggable database 151, which increases the performance of pluggable database 151. For example, increasing the processor core fraction or RAM provided to pluggable database 151 may decrease the latency and/or increase the throughput of pluggable database 151. For example, the increase may facilitate pluggable database 151 accepting more database connections to provide more database sessions to serve more clients. Herein, an operating amount is also known as a current amount.

In various embodiments, various other amounts may be calculated for pluggable database 151 in deployment 120 based on reduction limit A and operating amount C. For example as shown, maximum reduction F is an absolute amount of reduction of a resource that pluggable database 151 can tolerate. In an embodiment, maximum reduction F is the multiplicative product of operating amount C times reduction limit A. For example, when operating amount C is 1.2 processor cores and reduction limit A is 33%, then maximum reduction F is 1.2×33%=0.4, which means that pluggable database 151 can tolerate losing at most 0.4 processor cores.

Likewise, minimum amount G is the least amount of the resource that pluggable database 151 can tolerate. In an embodiment, minimum amount G is the subtractive difference of operating amount C minus maximum reduction F that in this example is 1.2−0.4=0.8, which means that pluggable database 151 should retain at least 0.8 processor cores.

1.2 Example Scenarios

In deployment 120, the database cluster may be in a steady operational state whose configuration is more or less static even though the load on the database cluster may fluctuate. Various scenarios may necessitate or benefit from reconfiguration of some or all of the database cluster. Some scenarios are intended, such as replication of a pluggable database for redundancy or horizontally scaling up or down or adding, removing, or upgrading a computer, virtual machine, or software application that the database cluster hosts. Other scenarios are unintended, such as failure of a pluggable database, a container database, a virtual machine, or a computer that the database cluster hosts. Various scenarios may variously increase, decrease, or not affect a resource. For example, a scenario may entail adding physical RAM to a computer and/or allocating more RAM to a pluggable database, a container database, and/or a virtual machine.

Some intended scenarios are as follows. A pluggable database may be added or removed or replication of a pluggable database may be increased or decreased for elastic horizontal scaling. A reduction limit for resource(s) for a pluggable database may be increased or decreased for vertical scaling such as for peak or off-peak hours. Periodic or scheduled reshuffling of assignments of pluggable databases to container databases may occur for deferred re-optimization based on accumulated changes of configurations or resources that had not immediately caused optimization. For upgrading software of replicas of a container database, a rolling restart of replicas, one at a time, may necessitate movement of pluggable databases during a maintenance window. This approach increases the serviceability and scalability of the database cluster and accelerates routine maintenance of the database cluster.

1.3 Configuration Planning

As explained above, according to available amounts of a resource provided by container databases, combined reduction limits for the resource for pluggable databases may leave a surplus of the resource that, when reconfiguration occurs, provides some freedom as to how the resource is reallocated and which pluggable databases should be moved into which respective container database to better utilize the resource and/or to maximize the reliability of the database cluster. Planning 130 is a temporal phase that optimizes the reconfiguration before the reconfiguration occurs. In a reactive embodiment, planning 130 is deferred until just in time such as when a failure occurs. In a proactive embodiment, planning 130 instead occurs as a precaution such as while the database cluster is without failure.

During planning 130, multiple alternative placements 161-162 are generated as proposed possible rearrangements of the database cluster that include respective movements of some pluggable databases between some container databases. For example as shown, alternative placement 161 moves pluggable database 152 into container database 141, and alternative placement 162 instead moves pluggable database 152 into container database 142 if pluggable database 152 is not already in container database 142. Alternative placements 161-162 may move respective counts of pluggable databases to and from respective counts of container databases. For example, alternative placement 162 may move no pluggable databases or fewer pluggable databases than alternative placement 161 moves. Generation of alternative placements 161-162, as proposals that respect all reduction limits for all resources for all pluggable databases 151-153, is discussed later herein.

During planning 130 and after generating alternative placements 161-162, the following quantitative analytics occur. A respective adjusted amount of a resource is calculated for each of pluggable databases 151-153 in each of alternative placements 161-162 that respectively may be more, less, or the same as the respective operating amounts. For example because alternative placement 161 increases a count of pluggable databases that share resources of container database 141, adjusted amount D of a resource for pluggable database 151 may be less than operating amount C but not: a) less than relative reduction limit A, absolute reduction F, nor minimum amount G, nor b) more than absolute available amount B. Although not shown, all of pluggable databases 151 in all of alternative placements 161-162 have respective adjusted amounts of resource(s).

Adjusted amount D may exceed minimum amount G, such as when container database 141 in alternative placement 161 would have more than enough of a resource to provide to pluggable database 151. In an embodiment, extra amount H is an additional surplus of a resource provided to pluggable database 151 in alternative placement 161, which is the subtractive difference between adjusted amount D minus minimum amount G. For example, when adjusted amount D is 0.9 and minimum amount G is 0.8 as discussed earlier herein, then extra amount H is 0.9−0.8=0.1 processor cores. Quantitative analytics based on extra amount H is presented below.

1.4 Resilience Score

As explained above, adjusted amount D may be more or less than operating amount C. In other words, alternative placement 161 may help or hinder the speed and/or reliability of pluggable database 151. Such impact to the performance of pluggable database 151 is measured as resilience score E that quantifies how well would pluggable database 151's demand for computer resources be satisfied in alternative placement 161. For example, a low resilience score E for pluggable database 151 means that pluggable database 151 is likely to be operationally stressed due to resource scarcity in alternative placement 161, which may cause poor performance of pluggable database 151 such as increased latency or decreased reliability.

In various embodiments, resilience score E is based on one, some, or all of quantities A-D and F-H. In an embodiment, resilience score E is proportional to extra amount H and/or adjusted amount D. In an embodiment, resilience score E is the ratio of extra amount H over maximum reduction F. For example, when extra amount H is 0.1 and maximum reduction F is 0.4 as discussed earlier herein, then resilience score E is 0.1/0.4=25%. For resilience score E, 100% would be ideal, and 0% would be barely tolerable.

Although not shown, same pluggable database 151 has a same or different resilience score in alternative placement 162. For example, because pluggable database 151 respectively does or does not share resources of container database 141 with pluggable database 152 in alternative placements 161-162, the resilience score of pluggable database 151 should be higher in alternative placement 162 than in alternative placement 161. Although not shown, pluggable databases 152-153 have respective resilience scores in alternative placements 161-162.

Comparison of alternative placements 161-162 based on resilience scores of pluggable databases 151-153 is discussed later herein. Alternative placement 161 may be deemed more resilient than alternative placement 162 based on resilience scores of pluggable databases 151-153. For example, the database cluster may benefit more from alternative placement 161 than from alternative placement 162 based on resilience scores of pluggable databases 151-153, which may cause alternative placement 161 to be selected during, or in anticipation of, various reconfiguration scenarios as discussed later herein.

1.5 Failover

In an embodiment, alternative placement 161 is proactively selected in anticipation of a potential failure that has not occurred. If the failure later occurs, some or all pluggable databases would be moved to container databases as assigned in alternative placement 161. For example, software and data files associated with those pluggable databases may be prepositioned for immediate availability after moving the pluggable databases in response to a failure. This approach increases the reliability and availability of the database cluster and accelerates recovery for the database cluster.

In an embodiment, planning 130 anticipates a sequence of a few failures such as two or more. For example, planning 130 may proactively propose a first set of alternative placements for reconfiguring after a first failure and proactively propose a second set of alternative placements for reconfiguring after both of the first failure and a second failure. As explained earlier herein, reduction limit A of a resource may be defined as a fraction for operating amount C. In an embodiment, the first and second failures may have different respective fractions as respective reduction limits for the resource. For example, a service level agreement (SLA) may specify a sequence of reduction limits or a sequence of absolute minimum resource amounts as discussed earlier herein. For example, the first failure may tolerate operating amount C being reduced by 50%, and the second failure may tolerate operating amount C being reduced instead by 100% that means any reduction, no matter how drastic, is tolerable.

As explained earlier herein, there may be multiple multi-instance container databases and movement of an instance of a pluggable database may be restricted to moving only between instances of a same container database. In an embodiment, each multi-instance container database is operated as a separate cluster and planning 130 generates separate respective sets of alternative placements for each cluster. Even when multiple multi-instance container databases operate as separate clusters, various embodiments may or may not host different multi-instance container databases in a same computer or virtual machine as discussed later herein. Due to such infrastructure sharing, a failover or reconfiguration in one cluster may cause planning 130 and/or reconfiguration in the other cluster.

2.0 Resilience Measurement Process

Figure 2:
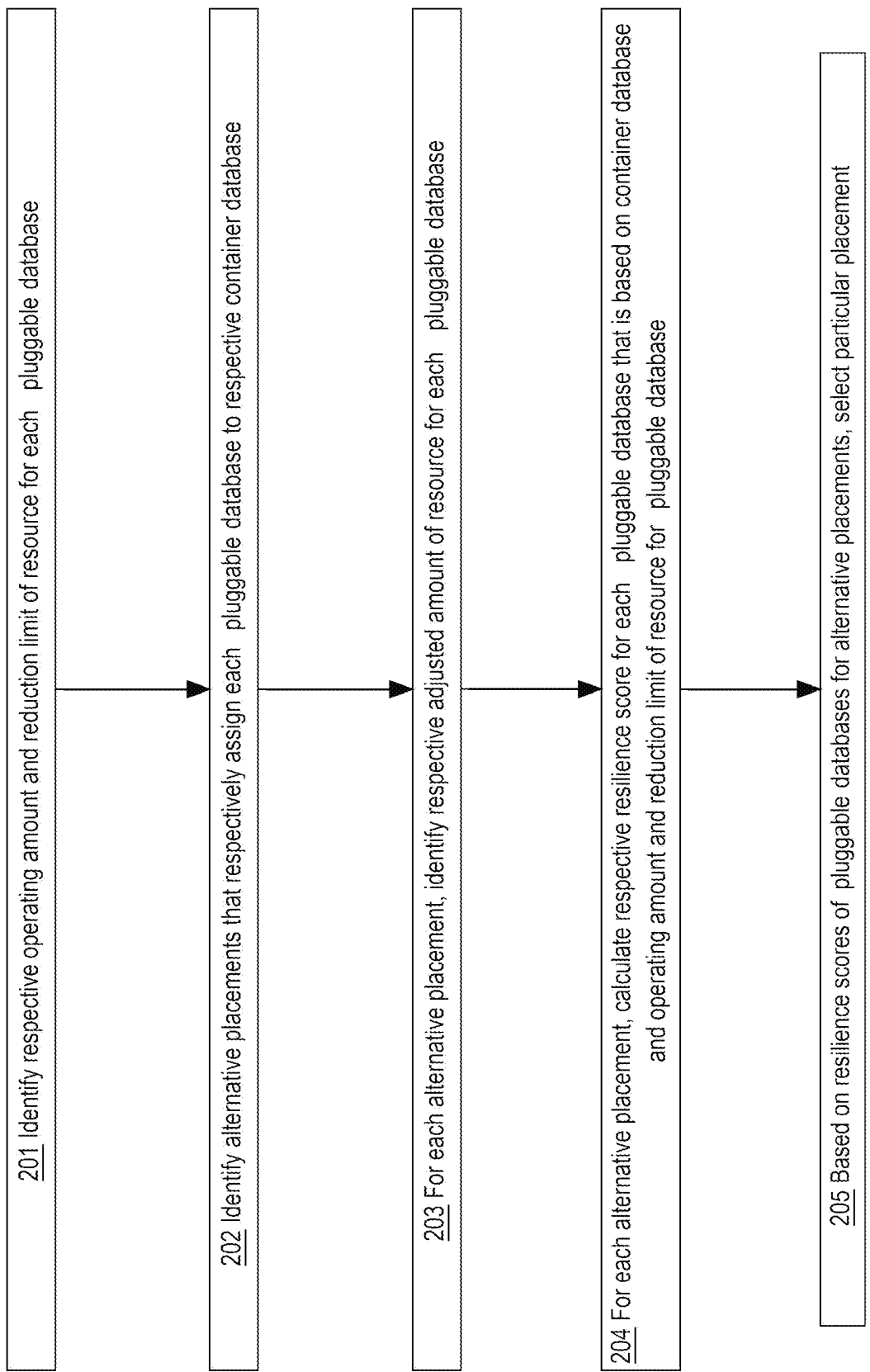
FIG. 2 is a flow diagram that depicts an example computer process that plans ahead for resiliently moving pluggable databases between instances of container database(s) after failover.

FIG. 2 is a flow diagram that depicts an example computer process to plan ahead for resiliently moving any of pluggable databases 151-153 between container databases 141-142 after failover, in an embodiment. For example, the database cluster may contain controller computer(s) that perform the process of FIG. 2. FIG. 2 is discussed with reference to FIG. 1.

Step 201 identifies a respective reduction limit for a resource for each pluggable database 151-153. For example, each of pluggable databases 151-153 may contain or otherwise be associated with respective metadata that declares respective reduction limits for resource(s) that the database cluster should always respect no matter which of container databases 141-142 may host which of pluggable databases 151-153. For example, a descriptor may specify reduction limit A of a resource for pluggable database 151.

During planning 130, step 202 identifies alternative placements 161-162 that respectively assign each of pluggable databases 151-153 to a respective container database. Step 202 heeds the reduction limits for resource(s) when placing any pluggable database in any container database in either of alternative placements 161-162. For example, alternative placement 161 places pluggable databases 151-152 in same container database 141 that provides available amount B of a resource that should not be exceeded by a sum of respective minimum amounts for that resource for pluggable databases 151-152, such as minimum amount G that is based on reduction limit A.

As discussed earlier herein, databases 141-142 and 151-153 may be associated with amounts of various resources such as quantities A-C and F-G. In an embodiment, step 202 uses a linear programing solver that quantitatively analyzes such amounts of resource(s) of pluggable databases 151-153 and/or container databases 141-142 to generate alternative placements 161-162 as proposals. That is, some or all of the quantities in constraints 110 and deployment 120 may be accepted as input by a linear solver and thus optimized.

For example, some or all of quantities such as A-C and F-G of databases 141-142 and/or 151-153 may be terms in linear equations such as one equation per container database, one equation per pluggable database, and/or one equation per resource. In an embodiment, quantities A-C are inputs, and some or all of amounts D-H are intermediate terms that are based on quantities A-C within, and calculated by, the equations.

Such a system of linear equations may be solved by a third-party numerical analysis library such as NumPy for python. A system of linear equations may have multiple solutions. For example, alternative placements 161-162 may each be based on a respective different solution identified by the linear solver for a same set of linear equations. In an embodiment, a bin packing algorithm is used instead of, or in addition to, a linear programming solver.

For each of alternative placements 161-162, step 203 identifies a respective adjusted amount of the resource for each of pluggable databases 151-153. For example, container database 141 provides available amount B of a resource that is shared by pluggable databases 151-152 in alternative placement 161. Opposite limits on respective adjusted amounts of the resource for pluggable databases 151-152 in alternative placement 161 are: a) respective reduction limits for the resource for pluggable databases 151-152, and b) available amount B of the resource from container database 141. Between limits (a)-(b) is a range of possible adjusted amounts of the resource for pluggable databases 151-152.

For example when available amount B of the resource exceeds a sum of minimum amounts of the resource for pluggable databases 151-152, such as minimum amount G, then extra amount(s) may be provided, such as extra amount H, that increase the adjusted amount of the resource for pluggable database 151 and/or 152. In an embodiment during planning 130, different allocations of a same total surplus amount of available amount B may be used to generate slightly different alternative placements. For example, alternative placement 161 may be one of multiple alternative placements that: a) put pluggable databases 151-152 into container database 141, and b) variously give the whole surplus amount of the resource respectively to pluggable database 151 or 152 or give each of pluggable databases 151-152 an equal or unequal share of the surplus amount.

For each of alternative placements 161-162, step 204 calculates a respective resilience score for each of pluggable databases 151-153 that is based on a respective container database that contains the pluggable database. For example in alternative placements 161-162, pluggable database 152 is likely to have different respective resilience scores because each of alternative placements 161-162 puts pluggable database 152 in a different container database. Likewise even though alternative placements 161-162 both leave pluggable database 151 in same container database 141, pluggable database 151 is likely to have different respective resilience scores because alternative placements 161-162 respectively do or do not share available amount B of the resource with other pluggable database 152.

Based on resilience scores of pluggable databases 151-153 for alternative placements 161-162, step 205 selects a particular placement from alternative placements 161-162. In an embodiment for each of alternative placements 161-162, step 205 may sum the resilience scores of pluggable databases 151-153 such that each of alternative placements 161-162 has a respective sum. Step 205 may select a placement with a highest sum or lowest variance of resilience scores of pluggable databases 151-153. Mathematics for comparing alternative placements 161-162 based on resilience scores and statistics such as sum, minimum, maximum, average, and variance are discussed later herein.

For example, step 205 may select alternative placement 161 when the database cluster or the controller computer boots. If a failure later occurs that invalidates the current placement of deployment 120, then pluggable databases may be moved into different container databases as needed to materialize alternative placement 161. In that case, alternative placement 161 becomes the new arrangement of deployment 120. For example, the process of FIG. 2 may recur after reconfiguration in anticipation of another failure needing another reconfiguration as discussed earlier herein.

3.0 Example Cluster Topology

FIG. 3 is a block diagram that depicts an example placement 300, in an embodiment. Depending on the scenario, placement 300 may be a currently operating configuration of a database cluster or an alternative placement for the database cluster in the future. FIG. 3 is discussed with reference to FIG. 1 such as with databases 141-142 and 151-152 that are shown in both FIGS. 1 and 3.

Placement 300 reflects the topology of a database cluster that contains computers 311-313 that may each be a rack server such as a blade or other networked computing device. The topology of placement 300 may be a containment hierarchy of multiple levels. For example as shown: computer 311 may contain virtual machines 321-322; virtual machine 321 may contain container databases 141-142; and container database 141 may contain pluggable databases 151-152. Although not shown: container databases 142 and 340 may contain pluggable databases; virtual machine 322 may contain container databases that contain pluggable databases; and computer 313 may contain virtual machines that contain container databases that contain pluggable databases.

Each of virtual machines 321-323 may emulate an operating system and/or computer that is similar or different from computer 311 and/or computer 311's operating system. For example compared to computer 311, virtual machine 321 may have a same or different instruction set architecture, a same or different operating system, a same or different operating system release version, a same or lesser amount of random access memory (RAM), a same or lesser amount of disk space, and a same or lesser count of processor cores. Computer 311 shares its resources with virtual machines 321-322 in a way that is more or less similar to how container database 141 shares its resources with pluggable databases 151-152 as described earlier herein. Likewise, virtual machine 321 shares its resources with container databases 141-142.

In other words, all computer resources originate from computers 311-313, and those resources are successively divided into smaller allocations along a containment hierarchy that extends from computer to virtual machine to container database to pluggable database. As explained earlier herein, a container database may have available amounts of resources. Although not shown, computers 311-313 and virtual machines 321-323 may also have available amounts of resources. For example in placement 300, the sum of available amounts of a resource for container databases 141-142 should not exceed the available amount of the resource for virtual machine 321. Likewise in placement 300, the sum of available amounts of the resource for virtual machines 321-322 should not exceed the available amount of the resource for computer 311.

3.1 Metadata Repository

In an embodiment, a central server or a shared file in a cross mounted filesystem operates as a metadata repository that records available amounts of resources for computers, virtual machines, and container database instances. In an embodiment, the metadata repository further records the current topology of the database cluster, including the containment hierarchy of pluggable databases within container databases within virtual machines within computers. For example, the metadata repository may be consulted to detect: a) whether a particular container database has a surplus amount of a resource needed to move a particular pluggable database into the container database, or b) which pluggable databases would need to be moved if a particular virtual machine were to fail. In an embodiment, there is no central metadata repository, and computers, virtual machines, and/or container databases should be polled to discover a containment hierarchy and resource availabilities.

3.2 Rollup of Resilience Scores

In an embodiment, each of container databases 141-142 and 340 may have a respective resilience score in placement 300. For example, container database 142 has resilience score F in placement 300. For each alternative placement, a respective resilience score may be calculated for each container database instance that is based on the resilience scores of pluggable databases contained in the container database instance. In various embodiments, resilience score J is an average, sum, minimum, or maximum of resilience scores of pluggable databases contained in container database 142. In an embodiment, multiple alternative placements may be compared based on respective resilience scores of container databases 141-142 and 340 such as for selecting a most resilient placement.

In an embodiment, each of virtual machines 321-323 may have a respective resilience score in placement 300. For example, virtual machine 322 has resilience score K in placement 300. For each alternative placement, a respective resilience score may be calculated for each virtual machine that is based on the resilience scores of container databases hosted by the virtual machine. In various embodiments, resilience score K is an average, sum, minimum, or maximum of resilience scores of container databases hosted in virtual machine 322. In an embodiment, multiple alternative placements may be compared based on respective resilience scores of virtual machines 321-323 such as for selecting a most resilient placement.

In an embodiment, each of computers 311-313 may have a respective resilience score in placement 300. For example, computer 313 has resilience score L in placement 300. For each alternative placement, a respective resilience score may be calculated for each computer that is based on the resilience scores of virtual machines hosted by the computer. In various embodiments, resilience score L is an average, sum, minimum, or maximum of resilience scores of virtual machines hosted in computer 313. In an embodiment, multiple alternative placements may be compared based on respective resilience scores of computers 311-313 such as for selecting a most resilient placement.

In an embodiment, each alternative placement may have a respective resilience score that may be calculated based on the resilience scores of computers 311-313. In various embodiments, the resilience score of placement 300 is an average, sum, minimum, or maximum of resilience scores of computers 311-313. In an embodiment, multiple alternative placements may be compared based on their respective resilience scores such as for selecting a most resilient placement.

3.3 Exemplary Embodiments

In an embodiment, the containment hierarchy of computers, virtual machines, and container databases is identical in multiple alternative placements. Likewise, available amounts of resources for computers, virtual machines, and container databases do not vary between multiple alternative placements. In an embodiment, only assignments of pluggable databases into container databases and adjusted amounts of resources for pluggable databases may vary between multiple alternative placements.

In an embodiment, a pluggable database, a container database, a virtual machine, or a computer may fail, which may require movement of many pluggable databases to different container databases. For example although not shown, pluggable databases 151-152 may currently operate in container database 340, and placement 300 may be a proposed movement of pluggable databases 151-152 into container database 141 in case a failure later strikes container database 340, virtual machine 323, or computer 312. In an alternative placement not shown, pluggable databases 151-152 may instead be moved into separate container databases, separate virtual machines, and/or separate computers.

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
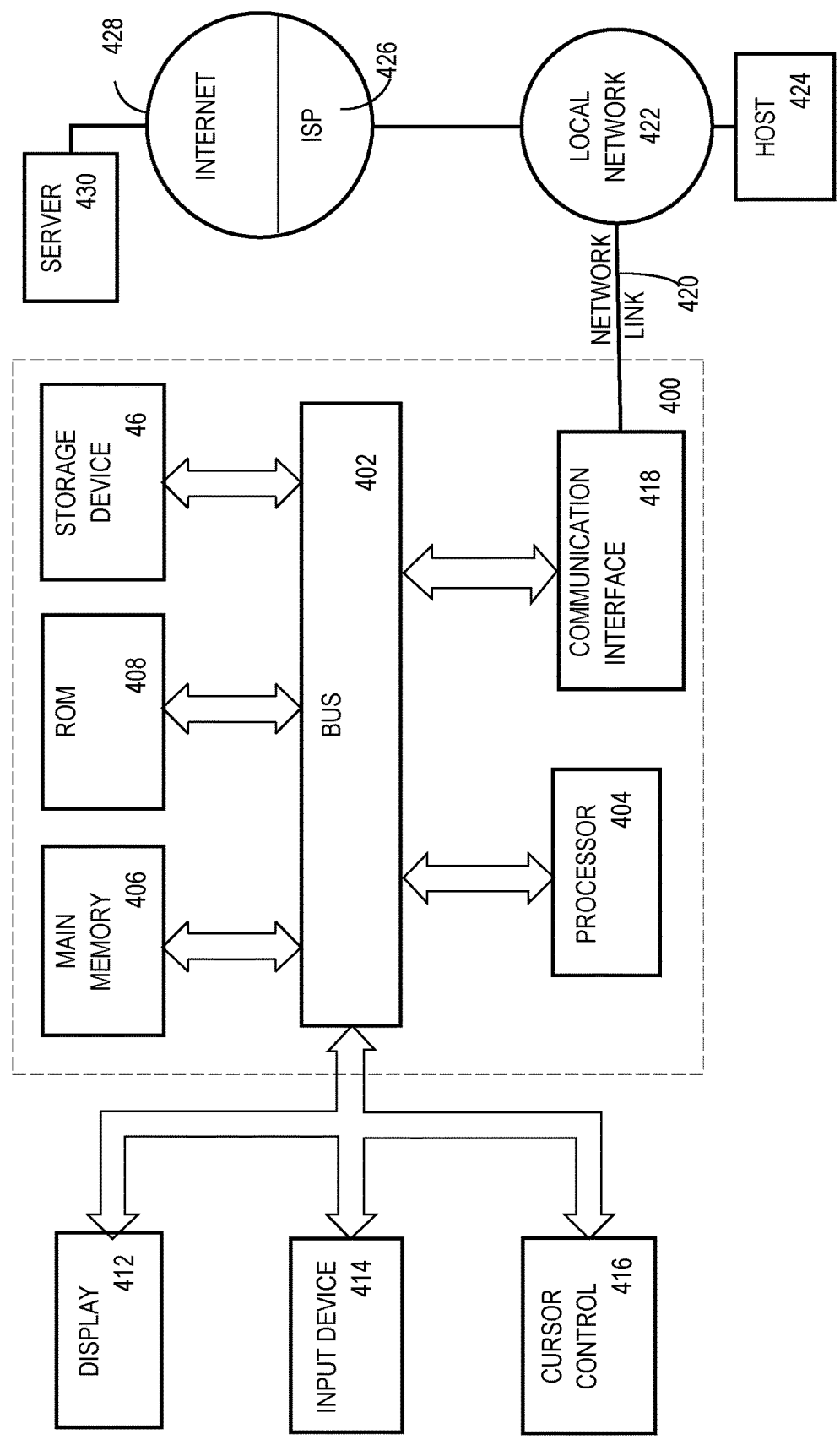
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 46, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 46. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 46. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 46, or other non-volatile storage for later execution.

Software Overview

Figure 5:
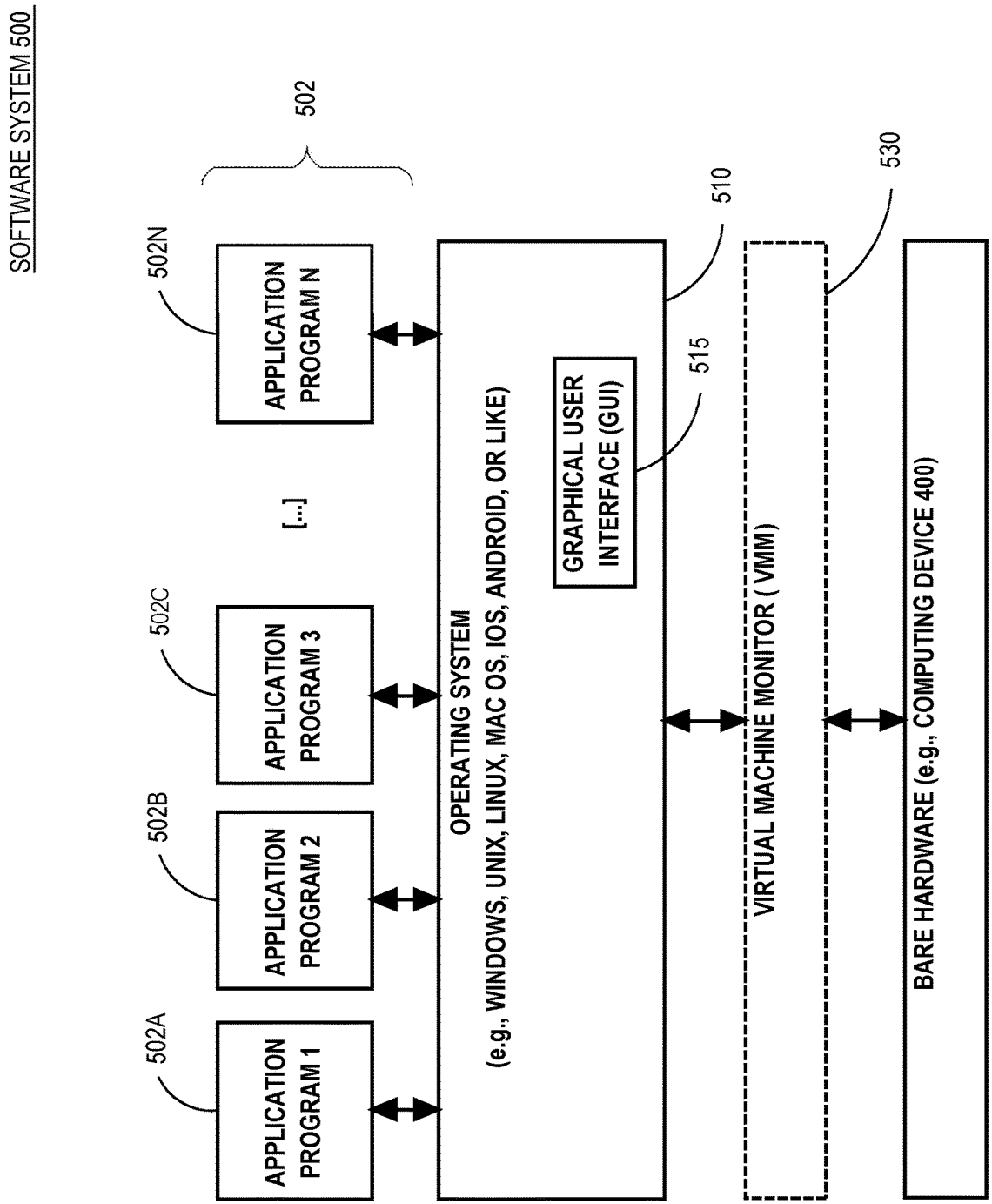
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 46, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 46 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a plurality of alternative placements each of which assigns each pluggable database of a plurality of pluggable databases to a respective container database of a plurality of container databases, wherein:
   a) for each alternative placement of the plurality of alternative placements, each container database of the plurality of container databases contains respective one or more pluggable databases of the plurality of pluggable databases;
   b) each pluggable database of the plurality of pluggable databases has:
      a respective operating amount of a resource and
      a respective reduction limit for the resource;
   for each alternative placement of the plurality of alternative placements;
   a) calculating a respective resilience score for each pluggable database of the plurality of pluggable databases that is based on:
      the container database of the pluggable database, and
      the respective operating amount and reduction limit of the resource for the pluggable database;
   b) calculating a respective resilience score for each container database of the plurality of container databases that is based on the respective resilience scores of the respective one or more pluggable databases of the container database for the alternative placement;
   selecting, based on the respective resilience scores of the plurality of container databases for the plurality of alternative placements, a particular placement of the plurality of alternative placements; and
   configuring, based on the particular placement of the plurality of alternative placements, the plurality of pluggable databases in the plurality of container databases;
   wherein the method is performed by one or more computers.

2. The method of claim 1 wherein:
   the method further comprises for each alternative placement of the plurality of alternative placements, identifying a respective adjusted amount of the resource for each pluggable database of the plurality of pluggable databases;
   for each alternative placement of the plurality of alternative placements, said calculating the respective resilience score for each pluggable database of the plurality of pluggable databases is further based on a respective difference between the respective adjusted amount of the resource and the respective operating amount of the resource for each pluggable database of the plurality of pluggable databases for the alternative placement.

3. The method of claim 1 wherein for each alternative placement of the plurality of alternative placements, the respective resilience score for each pluggable database of the plurality of pluggable databases is proportional to a respective adjusted amount of the resource of the pluggable database for the alternative placement.

4. The method of claim 1 wherein the resource is at least one selected from the group consisting of: nonvolatile storage, random access memory (RAM), network bandwidth, and a fraction of a processor core.

5. The method of claim 4 wherein the fraction of the processor core may be less than ten percent.

6. The method of claim 1 wherein:
the plurality of alternative placements is based on a possible failover that has not occurred;
said possible failover that has not occurred would involve at least one selected from the group consisting of: a failed pluggable database, a failed container database, a failed virtual machine, and a failed computer.

7. The method of claim 1 wherein:
for each alternative placement of the plurality of alternative placements, each container database of the plurality of container databases contains respective one or more pluggable databases of the plurality of pluggable databases;
the method further comprises for each alternative placement of the plurality of alternative placements, calculating a respective resilience score for each container database of the plurality of container databases that is based on the respective resilience scores of the respective one or more pluggable databases of the container database for the alternative placement;
said selecting the particular placement of the plurality of alternative placements is based on the respective resilience scores of the plurality of container databases for the plurality of alternative placements.

8. The method of claim 7 wherein:
for each alternative placement of the plurality of alternative placements, each virtual machine of a plurality of virtual machines contains respective one or more container databases of the plurality of container databases;
the method further comprises for each alternative placement of the plurality of alternative placements, calculating a respective resilience score for each virtual machine of the plurality of virtual machines that is based on the respective resilience scores of the respective one or more container databases of the virtual machine for the alternative placement;
said selecting the particular placement of the plurality of alternative placements is based on the respective resilience scores of the plurality of virtual machines for the plurality of alternative placements.

9. The method of claim 8 wherein:
the method further comprises for each alternative placement of the plurality of alternative placements, calculating a respective resilience score for each computer of a plurality of computers that is based on resilience scores of one or more virtual machines of the computer for the alternative placement;
said selecting the particular placement of the plurality of alternative placements is based on the respective resilience scores of the plurality of computers for the plurality of alternative placements.

10. The method of claim 9 wherein:
the method further comprises calculating a respective resilience score for each alternative placement of the plurality of alternative placements that is based on the respective resilience scores of the plurality of computers for the alternative placement;
said selecting the particular placement of the plurality of alternative placements is based on the respective resilience scores of the plurality of alternative placements.

11. The method of claim 1 wherein said identifying the plurality of alternative placements further comprises a linear programing solver analyzing amounts of one or more resources for the plurality of pluggable databases for the plurality of alternative placements.

12. The method of claim 1 wherein the plurality of pluggable databases has at least two thousand pluggable databases.

13. One or more non-transitory computer-readable media storing instructions that, when executed by one or more processors, cause:
identifying a plurality of alternative placements each of which assigns each pluggable database of a plurality of pluggable databases to a respective container database of a plurality of container databases, wherein:
a) for each alternative placement of the plurality of alternative placements, each container database of the plurality of container databases contains respective one or more pluggable databases of the plurality of pluggable databases;
b) each pluggable database of the plurality of pluggable databases has:
a respective operating amount of a resource and
a respective reduction limit for the resource;
for each alternative placement of the plurality of alternative placements;
a) calculating a respective resilience score for each pluggable database of the plurality of pluggable databases that is based on:
the container database of the pluggable database, and
the operating amount and reduction limit of the resource for the pluggable database;
b) calculating a respective resilience score for each container database of the plurality of container databases that is based on the resilience scores of the one or more pluggable databases of the container database for the alternative placement;
selecting, based on the resilience scores of the plurality of container databases for the plurality of alternative placements, a particular placement of the plurality of alternative placements; and
configuring, based on the particular placement of the plurality of alternative placements, the plurality of pluggable databases in the plurality of container databases.

14. The one or more non-transitory computer-readable media of claim 13 wherein:
the instructions further cause for each alternative placement of the plurality of alternative placements, identifying a respective adjusted amount of the resource for each pluggable database of the plurality of pluggable databases;
for each alternative placement of the plurality of alternative placements, said calculating the respective resilience score for each pluggable database of the plurality of pluggable databases is further based on a respective difference between the respective adjusted amount of the resource and the respective operating amount of the resource for each pluggable database of the plurality of pluggable databases for the alternative placement.

15. The one or more non-transitory computer-readable media of claim 14 wherein for each alternative placement of the plurality of alternative placements, the respective resilience score for each pluggable database of the plurality of pluggable databases is proportional to a respective adjusted amount of the resource of the pluggable database for the alternative placement.

16. The one or more non-transitory computer-readable media of claim 13 wherein:
the plurality of alternative placements is based on a possible failover that has not occurred;

said possible failover that has not occurred would involve at least one selected from the group consisting of: a failed pluggable database, a failed container database, a failed virtual machine, and a failed computer.

17. The one or more non-transitory computer-readable media of claim 13 wherein:
   for each alternative placement of the plurality of alternative placements, each container database of the plurality of container databases contains respective one or more pluggable databases of the plurality of pluggable databases;
   the instructions further cause for each alternative placement of the plurality of alternative placements, calculating a respective resilience score for each container database of the plurality of container databases that is based on the respective resilience scores of the respective one or more pluggable databases of the container database for the alternative placement;
   said selecting the particular placement of the plurality of alternative placements is based on the respective resilience scores of the plurality of container databases for the plurality of alternative placements.

18. The one or more non-transitory computer-readable media of claim 17 wherein:
   for each alternative placement of the plurality of alternative placements, each virtual machine of a plurality of virtual machines contains respective one or more container databases of the plurality of container databases;
   the instructions further cause for each alternative placement of the plurality of alternative placements, calculating a respective resilience score for each virtual machine of the plurality of virtual machines that is based on the respective resilience scores of the respective one or more container databases of the virtual machine for the alternative placement;
   said selecting the particular placement of the plurality of alternative placements is based on the respective resilience scores of the plurality of virtual machines for the plurality of alternative placements.

19. The one or more non-transitory computer-readable media of claim 18 wherein:
   the instructions further cause for each alternative placement of the plurality of alternative placements, calculating a respective resilience score for each computer of a plurality of computers that is based on resilience scores of one or more virtual machines of the computer for the alternative placement;
   said selecting the particular placement of the plurality of alternative placements is based on the respective resilience scores of the plurality of computers for the plurality of alternative placements.

20. The one or more non-transitory computer-readable media of claim 19 wherein:
   the instructions further cause calculating a respective resilience score for each alternative placement of the plurality of alternative placements that is based on the respective resilience scores of the plurality of computers for the alternative placement;
   said selecting the particular placement of the plurality of alternative placements is based on the respective resilience scores of the plurality of alternative placements.

\* \* \* \* \*